United States Patent
Lussier

(10) Patent No.: US 11,951,912 B1
(45) Date of Patent: Apr. 9, 2024

(54) DOOR MOUNT DEVICE HOLDER

(71) Applicant: CatchJak Inc., Wilmington, DE (US)

(72) Inventor: Chad Lussier, Wilmington, DE (US)

(73) Assignee: Catchjak Inc.

( * ) Notice: Subject to any disclaimer, the term of this patent is extended or adjusted under 35 U.S.C. 154(b) by 58 days.

(21) Appl. No.: 17/878,219

(22) Filed: Aug. 1, 2022

(51) Int. Cl.
*B60R 11/02* (2006.01)
*B60R 7/04* (2006.01)
*B60R 11/00* (2006.01)

(52) U.S. Cl.
CPC .......... *B60R 11/0241* (2013.01); *B60R 7/046* (2013.01); *B60R 11/0258* (2013.01); *B60R 2011/0026* (2013.01); *B60R 2011/0056* (2013.01); *B60R 2011/0059* (2013.01); *B60R 2011/0063* (2013.01); *B60R 2011/0091* (2013.01)

(58) Field of Classification Search
CPC . B60R 11/0241; B60R 7/046; B60R 11/0258; B60R 2011/0026; B60R 2011/0056; B60R 2011/0059; B60R 2011/0063; B60R 2011/0091
USPC ...... 248/686, 690, 692, 205.2, 205.3, 205.5, 248/208, 300, 301, 307, 309.3, 363
See application file for complete search history.

(56) References Cited

U.S. PATENT DOCUMENTS

| | | | | |
|---|---|---|---|---|
| 1,486,566 A | * | 3/1924 | Crecelius | B60R 7/046 224/543 |
| 2,202,412 A | * | 5/1940 | York | A47H 1/13 248/217.1 |
| 4,865,237 A | * | 9/1989 | Allen | A47G 23/0225 224/560 |
| 5,050,830 A | * | 9/1991 | Hall | A63B 57/207 248/205.2 |
| 5,285,938 A | | 2/1994 | Fauchald | |
| 5,573,214 A | * | 11/1996 | Jones | B60N 3/103 248/205.5 |
| 5,588,055 A | | 12/1996 | Williamson et al. | |
| 5,678,793 A | * | 10/1997 | Hill | A47G 23/0225 248/309.3 |
| 6,120,085 A | * | 9/2000 | Wooldridge | B60J 3/02 296/97.7 |
| 6,138,969 A | | 10/2000 | Olausson | |

(Continued)

FOREIGN PATENT DOCUMENTS

| | | |
|---|---|---|
| DE | 4239697 A1 | 6/1994 |
| DE | 19902764 A1 | 7/2000 |

(Continued)

*Primary Examiner* — Christopher Garft
*Assistant Examiner* — Michael McDuffie
(74) *Attorney, Agent, or Firm* — Rogowski Law LLC

(57) ABSTRACT

A holder for a handheld device, such as a cellular telephone, is a mount clip that attaches to a motor vehicle door. The first arm of the mount clip terminates with a hook or curve or bent edge. When inserted into the window slot of a motor vehicle door between the windowpane and the door panel, the hook or bent edge of the first arm engages with a portion of the window gasket. A mount fixture with a cradle or tray to hold the handheld device extends from the mount clip. When the holder is installed onto the driver's side door, the handheld device is positioned proximate or adjacent to the steering wheel and does not block the driver's access to the dashboard or the driver's view through the windshield.

20 Claims, 4 Drawing Sheets

(56) References Cited

U.S. PATENT DOCUMENTS

| | | | | |
|---|---|---|---|---|
| 6,196,605 B1 * | 3/2001 | Baldas | | B60R 7/046 |
| | | | | 224/543 |
| 7,007,908 B2 * | 3/2006 | Tsay | | G11B 33/00 |
| | | | | 248/205.5 |
| 7,226,026 B2 * | 6/2007 | Lin | | F16B 47/00 |
| | | | | 248/205.8 |
| 7,234,671 B2 * | 6/2007 | Avinger | | A01G 5/04 |
| | | | | 248/339 |
| 7,516,926 B2 * | 4/2009 | Liu | | F16B 47/006 |
| | | | | 248/205.5 |
| 7,850,133 B2 * | 12/2010 | Carnevali | | F16B 47/00 |
| | | | | 248/205.8 |
| 7,992,833 B1 | 8/2011 | Goodman | | A47G 25/0614 |
| | | | | 248/339 |
| 8,302,920 B2 * | 11/2012 | Tsai | | F16B 47/00 |
| | | | | 248/205.5 |
| 8,348,208 B1 * | 1/2013 | Talbott | | B60J 1/20 |
| | | | | 248/309.3 |
| 8,443,996 B2 * | 5/2013 | Ciarrocchi, Jr. | | B65D 25/20 |
| | | | | 248/311.2 |
| 8,690,166 B2 * | 4/2014 | Peota | | B62B 3/1472 |
| | | | | 220/482 |
| 9,254,793 B2 * | 2/2016 | Won | | B60R 11/02 |
| 9,604,580 B2 * | 3/2017 | Boer | | B64D 43/00 |
| 10,744,955 B2 | 8/2020 | Schmid | | |
| 11,197,547 B2 * | 12/2021 | Bolos | | A47B 57/045 |
| 2007/0001088 A1 * | 1/2007 | Bowman | | A47G 7/047 |
| | | | | 248/690 |
| 2009/0108152 A1 * | 4/2009 | Carnevali | | F16B 47/00 |
| | | | | 248/205.5 |
| 2011/0121148 A1 | 5/2011 | Pernia | | |
| 2016/0109060 A1 * | 4/2016 | Blair | | F16M 13/00 |
| | | | | 248/248 |

FOREIGN PATENT DOCUMENTS

| | | |
|---|---|---|
| FR | 2771231 A1 | 5/1999 |
| WO | 2005091606 A1 | 9/2005 |

* cited by examiner

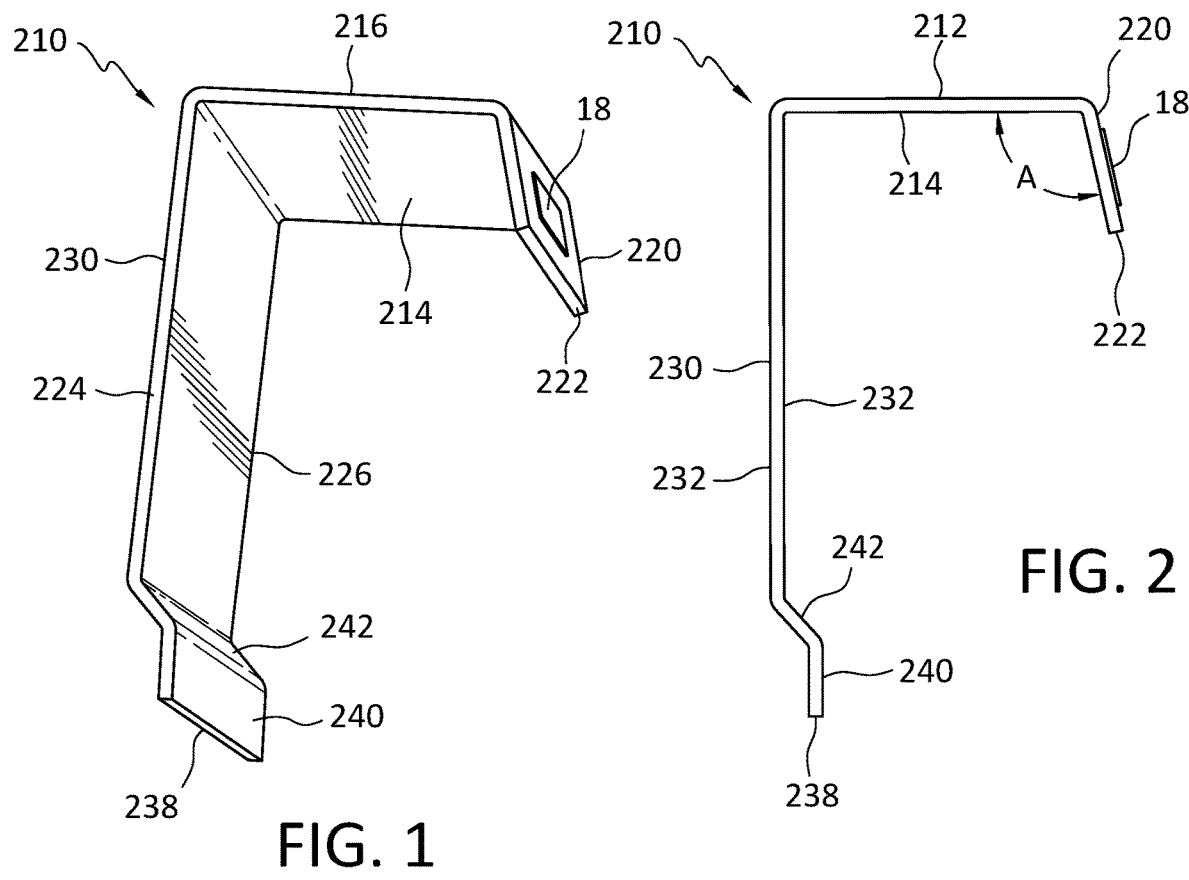
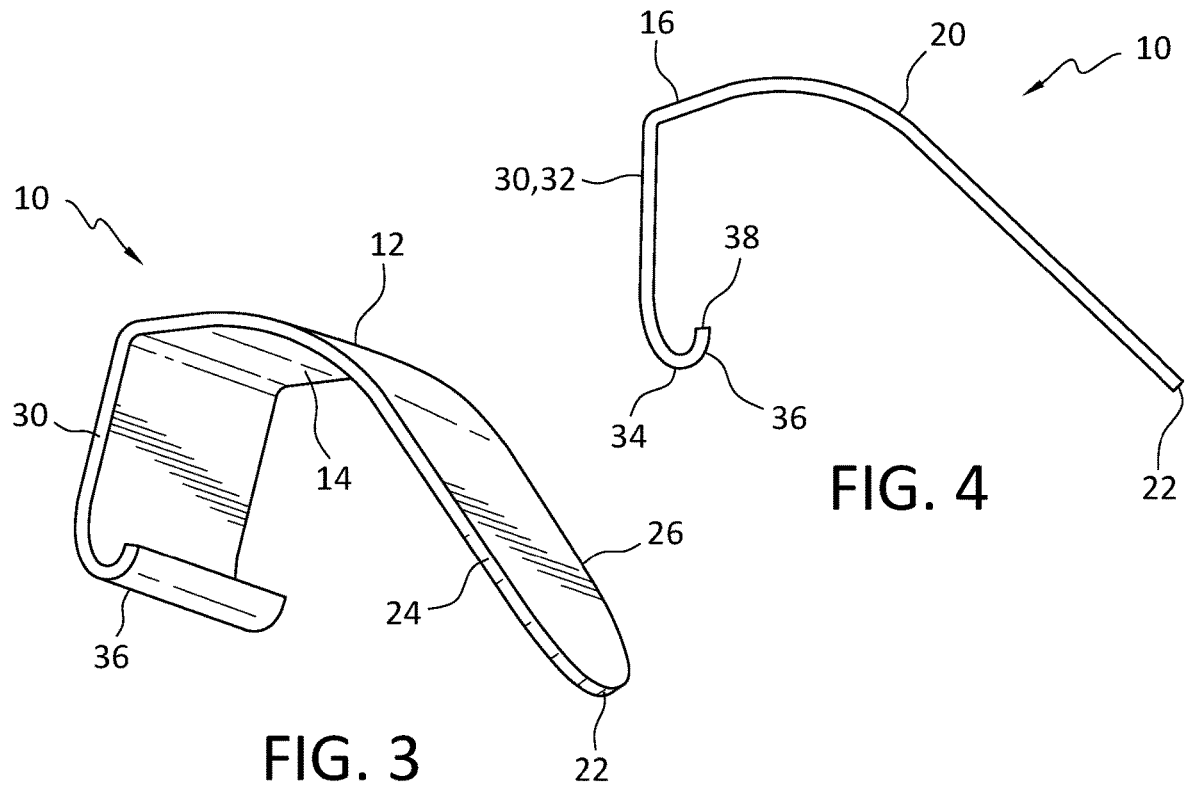

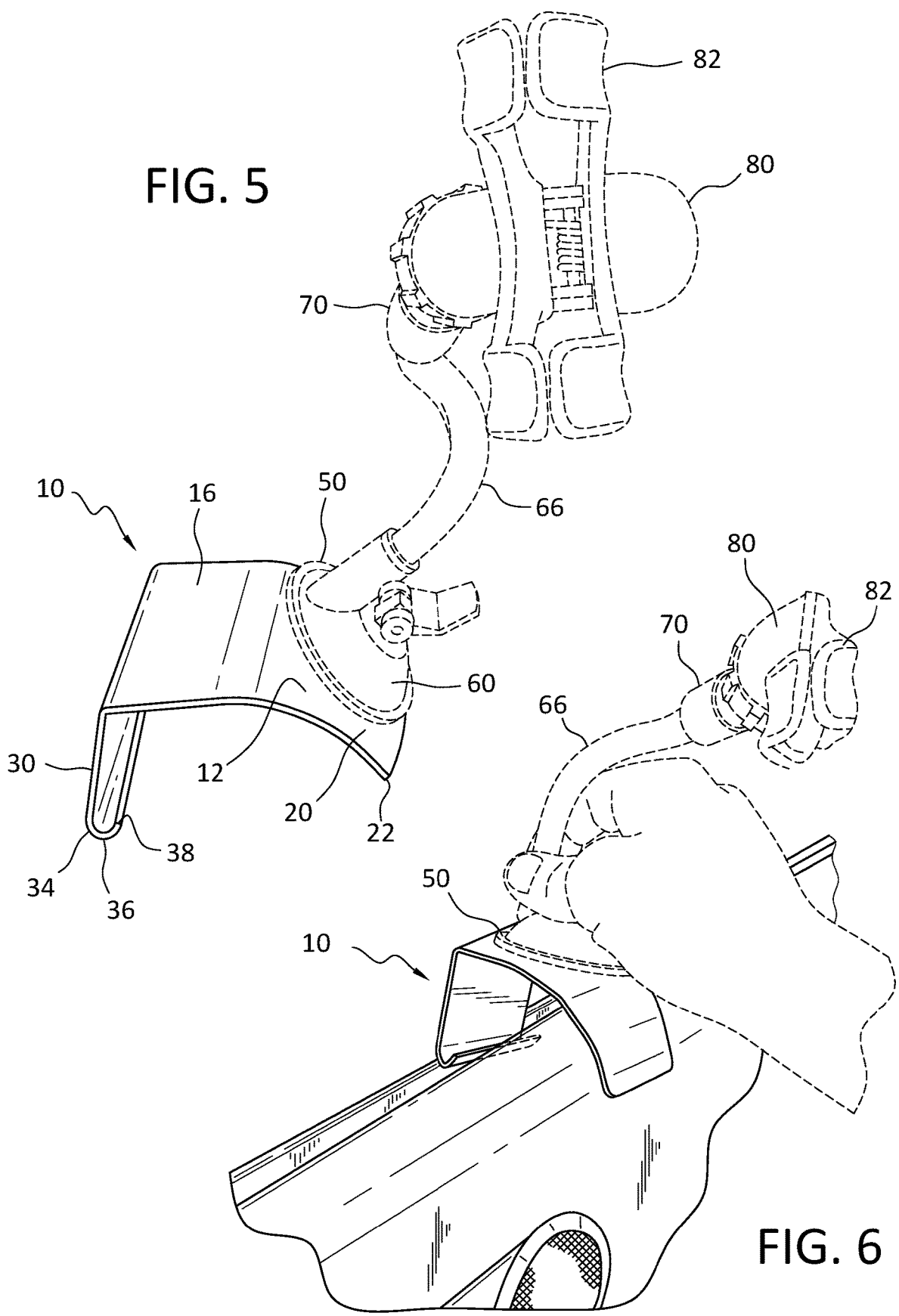

DOOR MOUNT DEVICE HOLDER

FIELD OF THE INVENTION

The present invention is generally directed to a holder that engages with the slot between the windowpane and the door window frame of a side door of a motor vehicle. The holder is configured to hold a handheld device, such as a cellular telephone or mobile telephone or other accessory, in position accessible to the driver without blocking line of sight to the front windshield or dashboard of the vehicle.

BACKGROUND OF THE INVENTION

Handheld devices, such as cellular telephones, feature various applications or "apps" that are useful to a motor vehicle driver. Besides ability to engage in telephonic conversations and texting, cellular telephones include apps that provide navigation assistance, weather forecasts, and traffic conditions, among other things.

Many states have enacted laws prohibiting use of handheld devices while operating a motor vehicle. Motor vehicle drivers who use handheld devices while driving should not hold those devices by hand. Doing so increases risk of collision with other vehicles, pedestrians, structures or objects. Not only does the driver take a hand off of the driving wheel, the driver is more likely to take his or her eyes from the road.

To address drivers' desire to have access to handheld devices while operating their vehicles, various accessories are proposed to enable hands-free operation. For example, holders for handheld devices have been proposed. In some instances, holders for cell phones or other handheld devices fit within one of the cup holding compartments provided in the vehicle. In some instances, holders engage with an air vent or other structure on the dashboard of the vehicle. In still other instances, holders engage to the front windshield or to the rearview mirror of the vehicle. These existing holders for handheld devices have downsides. They can limit the driver's access to cup holders for beverages, and they cause the driver to take his or her eyes from the road to look downward toward the handheld device in such cupholder. They can occlude the driver's vision to the road by blocking a portion of the windshield or rearview mirror. They can occlude the driver's access to features on the vehicle's dashboard.

In most instances the driver wishes to benefit from the apps provided with a handheld device while he or she is actively driving the motor vehicle. Thus, there is great need to position a holder for that device in a location that will not occlude the driver's vision to the road and will not block the driver's access to the vehicle's dashboard. There is great need moreover to position a holder for the device in a location that is more convenient to the driver and more easily viewed by the driver while the motor vehicle is on the road.

U.S. Pat. No. 5,285,938 proposes positioning a holder for a mobile telephone at a location that is adjacent to the driver's door and between the driver's door window and the steering wheel. The '938 patent shows a holder with an angled plate that has a limb adapted to fit in the slot between the windowpane of the driver's side door and the door trim. A U-shaped bracket is connected to the angled plate and a holder tray is in turn connected to the U-shaped bracket. The holder tray is held at one height in respect of the angled plate, and angular orientation of the holder tray can be adjusted. The limb of the angled plate merely frictionally engages in the slot, without means for ensuring stable connection therein. Moreover, the holder does not adapt for use with different vehicles. Accordingly, improvements for holding and supporting a handheld device within the passenger compartment of a motor vehicle continue to be sought.

An object of this invention is to provide a door mounted holder for a handheld device, such as a cell phone, that removably and securely connects to the motor vehicle door in a location accessible to the driver. Optionally, a door mounted holder for a handheld device has length adjustment for the clip arm so that the holder is adaptable for securement to the doors of different types of motor vehicles.

BRIEF SUMMARY OF THE INVENTION

According to one embodiment of the invention, a door mount holder for a handheld device attaches to a door of a motor vehicle. The door mount holder includes a mount clip that has a center portion, a first arm depending downwardly from the center portion and a second arm depending downwardly from the center portion. The first arm has a substantially straight length and terminates with a hook or bent edge at its distal end. The second arm either has a substantially curved length or, if straight, is disposed at an obtuse angle to center portion. The mount clip may be substantially C-shaped or substantially L-shaped. The first arm is configured to insertedly fit into a window slot of the motor vehicle door between a windowpane and a door panel of the window. When so inserted, the hook or bent edge engages with a portion of a gasket that is associated with the window slot. This engagement helps to secure the door mount holder to the vehicle door, keeping the first arm within the window slot. The center portion and the second arm of the door mount holder rest over the top edge of the window slot and over a portion of the trim of the vehicle door.

A mount fixture is secured either to the top surface of the center portion or to the top surface of the second arm. Alternatively, the mount fixture may be integrally formed in the top surface of the center portion or top surface of the second arm. The mount fixture is configured to engage with the handheld device. If not integrally formed, the mount fixture may be secured by suction or by hook and loop fasteners or by adhesive. The mount fixture may include a gooseneck, and may have a cradle or tray supported at one end of the gooseneck. The cradle or tray is configured to receive the handheld device. The cradle or tray may have a size-adjustable frame to grip edges of the handheld device and secure the handheld device therein.

In an alternative embodiment, a door mount holder for a handheld device may include a first arm that is length-adjusting. The door mount holder of this alternative embodiment has a mount clip with a center portion. The first arm depends downwardly from the center portion, and the first arm includes a slidingly engaged arm extension that has a substantially straight length and terminates with a hook or bent edge at its distal end. A second arm depends downwardly from the center portion and either has a substantially curved length or, if straight, is disposed at an obtuse angle to the center portion. The first arm together with the arm extension are configured to insertedly fit into a window slot of a motor vehicle door between a windowpane and a door panel of the window. The hook or bent edge of the arm extension is configured to engage with a portion of a gasket associated with the window slot. This engagement helps to secure the door mount holder to the vehicle door, keeping the first arm within the window slot. The center portion and the second arm of the door mount holder rest over the top edge of the window slot and over a portion of the trim of the vehicle door.

A mount fixture is secured either to the top surface of the center portion or to the top surface of the second arm. Alternatively, the mount fixture may be integrally formed in the top surface of the center portion or top surface of the second arm of the door mount holder. The mount fixture is configured to engage with the handheld device. If not integrally formed, the mount fixture may be secured by suction or by hook and loop fasteners or by adhesive. The mount fixture may include a gooseneck, and may have a cradle or tray supported at one end of the gooseneck. The cradle or tray is configured to receive the handheld device. The cradle or tray may have a size-adjustable frame to grip edges of the handheld device and secure the handheld device therein.

The mount clip portion of the door mount holder may be formed of a material that may be shaped or molded. Representative materials that may be used to make the mount clip include thermosetting plastics, fiber reinforced polymers, fiberglass reinforced plastics, carbon fiber reinforced polymers, rubbers, and latex.

Representative handheld devices that may be held in the cradle or tray of the door mount holder include, but are not limited to, a cellular telephone, a pager, or a navigation system unit. Other items that may be held by the cradle or tray of the door mount holder include, but are not limited to, hand sanitizer bottles or containers, trash receptacles and bags, or tissue dispensers or boxes.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings embodiments of door mountable holders for handheld devices which are presently preferred. It should be understood, however, that the disclosure is not limited to the precise arrangements and instrumentalities shown. In the drawings:

FIG. 1 is a left front perspective view of a first embodiment of a clip portion of a holder for a handheld device;

FIG. 2 is a side elevational view of the clip portion of FIG. 1;

FIG. 3 is a left front perspective view of a second embodiment of a clip portion of a holder for a handheld device;

FIG. 4 is a side elevational view of the clip portion of FIG. 3;

FIG. 5 is a left front perspective view of the clip portion of FIG. 3 to which a mount for a handheld device is attached;

FIG. 6 is a left front perspective view showing a first step for installing the clip portion and mount of FIG. 5 onto a door panel of a motor vehicle;

DESCRIPTION OF THE DISCLOSURE

Figure 7:
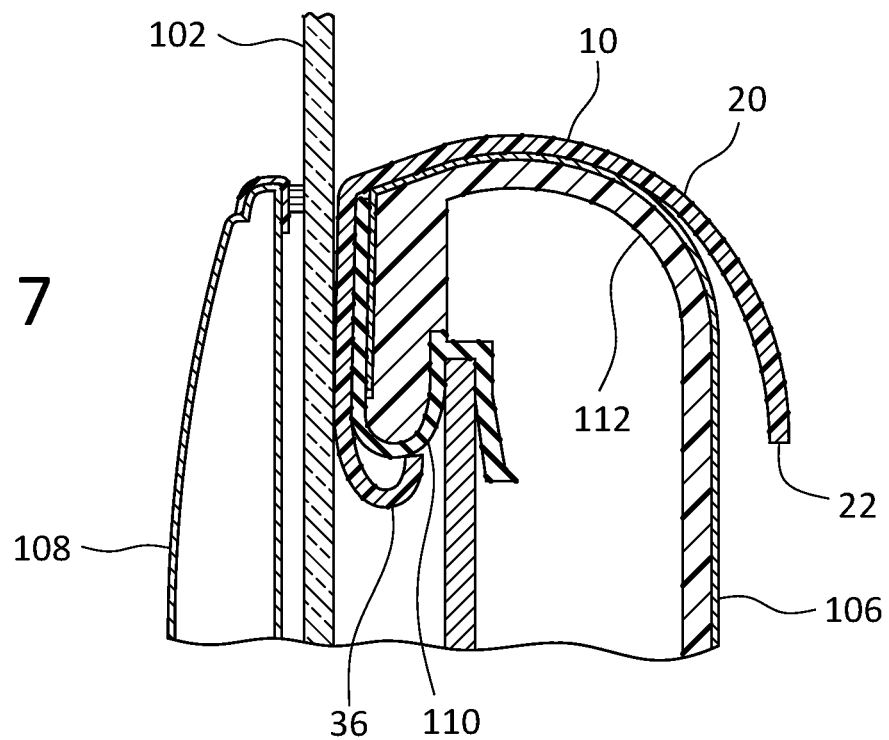
FIG. 7 is a cross-sectional view of the clip portion of FIG. 3 installed in the window slot of a door panel of a motor vehicle.

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1 and 2, a first embodiment of a mount clip 210 component of a holder for a handheld device 90 (such as a cellular telephone) is shown. The mount clip 210 has a generally inverted L-shape with a top surface 212 and a bottom surface 214 opposite the top surface 212. The mount clip 210 has a center portion 216 a first arm 230 that depends downwardly from one side of the center portion 216 and a second arm 220 that depends downwardly from another side of the center portion 216. The second arm 220 is bent generally at an obtuse angle A to the center portion 216, such as between 95 degrees and 120 degrees. The center portion 216 is generally planar. The first arm 230 is substantially straight along most of its length and forms a first bend 242 near the distal end or bottom edge 238. A surface 240 of the first arm 230 is offset from the straight region 232 of the first arm 230. In the embodiment shown in FIGS. 1 and 2, the first arm 230 is at an angle of about 90 degrees from the center portion 216, and the first bend 242 is at an angle of about 45 degrees. The surface 240 is at an angle of about 45 degrees from the first bend 242 and is generally parallel to the primary surface of the first arm 230.

The second arm 220 of the mount clip 210 is generally planar and bent downwardly and away from the top surface 212. The second arm 220 terminates at a front end or edge 222. Optionally, a fastener strip 18, such as a patch of a hook and loop fastener, is applied to the front surface of the second arm 220. The fastener strip 18 is adapted to removably secure a mount fixture 50 of a holder for a handheld device 90. See, e.g., FIG. 5 in reference to the alternative embodiment. Alternatively, the mount fixture of a holder for a handheld device 90 may be provided with adhesive or suction means configured to attach to the second arm 220. A representative adhesive is a clear solvent cement, such as SCIGRIP 16 Fastset by IPS corp. In yet another embodiment, the mount fixture 50 may be integrally thermoformed with the center portion 216 or with the second arm 220 of the mount clip 210.

The mount clip 210 has a left side edge 224 and a right side edge 226. In the embodiment shown in FIGS. 1 and 2, the widths of the center portion 216, the first arm 230 (rear arm) and second arm 220 (front arm) are the same. The mount clip 210 of the embodiment shown in FIGS. 1 and 2 also has a generally uniform thickness of about 0.15 cm to 0.32 cm (thickness of plastic or polymer).

The bottom surface 214 of the center portion 216 and the bottom surface 214 of the second arm 220 are shaped to conform or seat over a portion of a top ledge and a trim interior of a door 100 of a motor vehicle as is described in more detail below with respect to the second embodiment of FIGS. 3 and 4. For the first embodiment of the clip mount 210, the first arm 230 is insertable into a window slot 104 of the door 100 between the window pane 102 and the passenger compartment door trim 106. The first bend 242 of the first arm 230 is positioned in contact with the window gasket 110 within the window slot 104. By so connecting or contacting the first bend 242 to the window gasket 110, the mount clip 210 is supported more stably to the vehicle door 100 with the first arm 230 in the window slot 104. The connection provided is secure enough to counter-balance the weight of a mount fixture 50 and associated cradle or tray 80 to hold a device, such as a cellular telephone 90. The first arm 230 thus remains within the window slot 104 unless and until the user disengages the first bend 242 of the first arm 230 from the window gasket 110.

Referring next to FIGS. 3 and 4, a second embodiment of a mount clip 10 component of a holder for a handheld device 90 is shown. The mount clip 10 is a clip with a top surface 12 and a bottom surface 14 opposite the top surface. The mount clip 10 has a center portion 16, a first arm 30 that depends downwardly from one side of the center portion 16 and a second arm 20 that depends downwardly from another side of the center portion 16. The center portion 16 can be generally planar, but may be slightly curved, or a combination of a flat portion and a curved portion as shown in FIGS. 3 and 4. The first arm 30 is substantially straight along its length and terminates in a hook or curve 36 at its distal end. The hook or curve 36 has a terminal edge 38 that points generally toward the bottom surface 14 of the of the center portion 16. The radius of curvature of the hook or curve 36 is between about 0.32 cm and 0.64 cm. The second arm 20 is curved along at least a portion of its length with a radius of curvature between about 3.8 cm and 7.6 cm. The second arm terminates at a front end or edge 22.

The mount clip 10 has a left side edge 24 and a right side edge 26. In the embodiment shown in FIGS. 3 and 4, the widths of the center portion 16, the first arm 30 (rear arm) and second arm 20 (front arm) (i.e., the width between the left side edge 24 and the right side edge 26) are the same. The mount 10 of the embodiment shown in FIGS. 3 and 4 also has a generally uniform thickness of about 0.15 cm to 0.32 cm (thickness of plastic or polymer). The bottom surface 14 of the center portion 16 and the bottom surface 14 of the second arm 20 are shaped to conform or seat over a portion of a top ledge and a trim interior 106 of a door 100 of a motor vehicle. (See FIGS., 7 and 8).

FIG. 5 shows a mount fixture 50 with a foot 60 secured to the top surface 12 of the mount clip 10. In FIG. 5, the foot 60 is secured to the second arm 20. Alternatively, the foot 60 may be secured to the center portion 16. The mount fixture 50 has a goose neck 66 supported by the mount fixture 50 at one end. A tray holder or cradle 80 for a cellular telephone 90 (see FIG. 8) is attached at the opposite end of the goose neck 66 by a rotatable fixture 70. The mount fixture 50 may be secured either to the top surface 12 of the center portion 16 or to the top surface of the second arm 20. In one advantageous embodiment the mount fixture 50 is removably secured by mating hook and loop fasteners 56, with one fastener patch applied to the mount clip 10 and another fastener patch applied to a bottom surface 54 of the mount fixture 50. In another advantageous embodiment, the mount fixture 50 is secured to the mount clip 10 by suction, a bottom surface of the mount fixture 50 is formed of a suction engaging material. In an alternate embodiment, the mount fixture 50 is secured to the mount clip 10 with adhesive. In yet another embodiment, the mount fixture 50 is integrally thermoformed with the center portion 16 or with the second arm 20.

Figure 8:
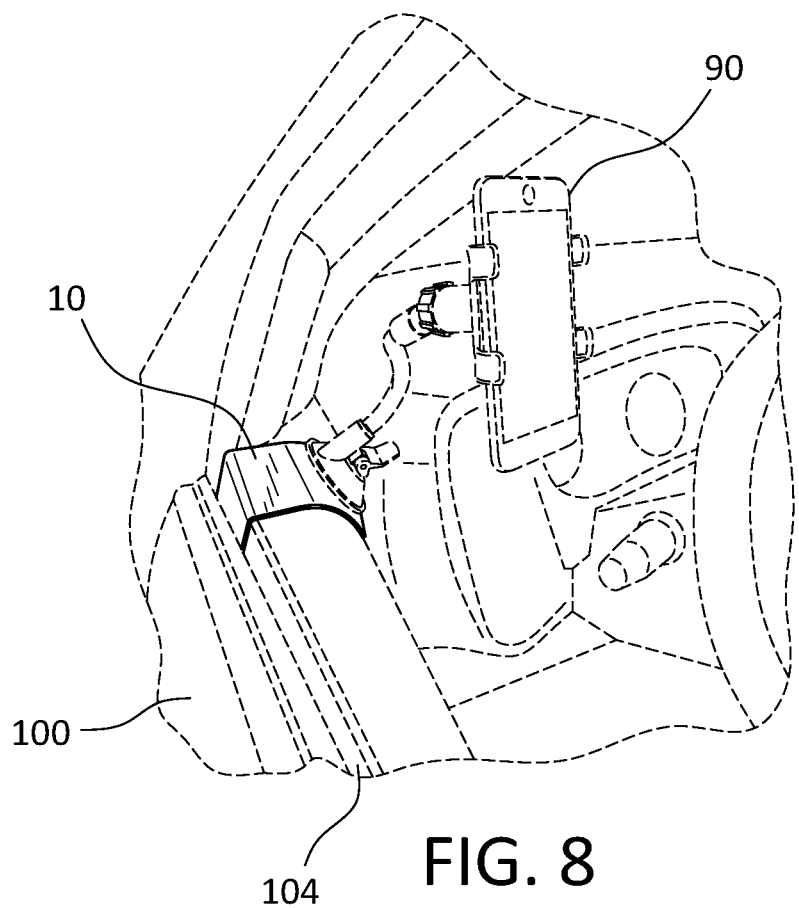
FIG. 8 is a left front perspective view of the holder for a handheld device as installed proximate the steering wheel of a motor vehicle, with a cellular telephone mounted in the cradle of the holder.

FIGS. 6-8 show how the mount clip 10 may be installed in the window slot 104 of a motor vehicle door 100. The first arm 30 is inserted into the window slot 104 between the windowpane 102 and the inner panel structure 112 of the vehicle door 100. The hook 36 or bent portion 42 engages with a portion of the window gasket 110 to anchor the first arm 30 of the mount in the window slot 104. The center portion 16 is seated over the upper edge of the door panel. The second arm 20 is seated over a portion of the interior door trim. As shown in FIG. 7, the gasket material 110 is held inside the hook 36, thereby stably holding the first arm 30 inside the slot 104 notwithstanding the weight of the mount fixture 50 and handheld device (cellphone 90) joined to the mount 10.

Generally, the mount fixture 50 will be secured to the mount clip 10 before the mount clip is engaged to the window slot 104 of the vehicle door 100. After the mount clip 10 is engaged to the window slot 104 of the vehicle door 100, a handheld device, such as a cellphone 90, is placed in the tray or cradle 80 of the mount fixture 50. In the embodiment shown in FIG. 8, the cradle 80 has width adjusting side frames 82 to grip the side edges of the cellphone 90. The gooseneck 66 and rotatable fixture 70 of the mount fixture 50 may be moved to adjust the orientation of the cellphone 90 while the cellphone 90 is held in the tray or cradle 80. As shown in FIG. 8, the cellphone 90 is held in a position proximate or adjacent to the steering wheel and to the front and side of the driver's field of vision. The cellphone 90 and holder 80 are not blocking any portion of the vehicle's windshield or dashboard. The cellphone 90 and holder 80 do not block any air vents. The cellphone 90 and holder 80 do not block use of other storage features provided in the vehicle, such as a cupholders or center consoles.

The mount clip 210 of FIGS. 1 and 2 may be installed onto a door of a motor vehicle similarly to the installation for the mount clip 10.

Figure 9:
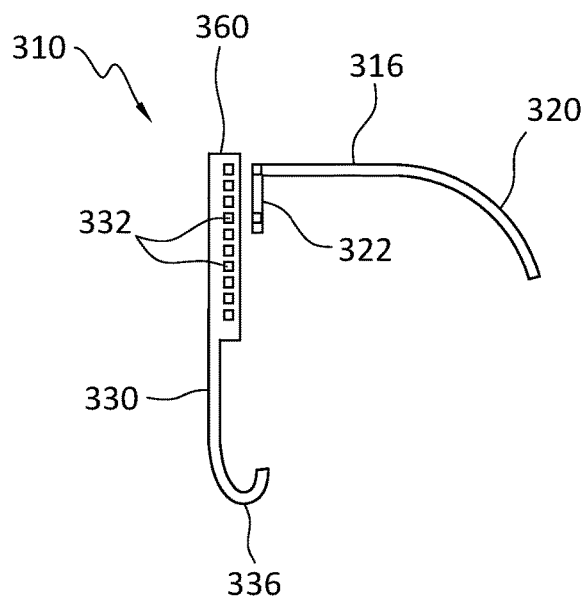
FIG. 9 is a left side elevational view of a third embodiment of a clip portion of a holder for a handheld device with a length-extendable arm.
Figure 10:
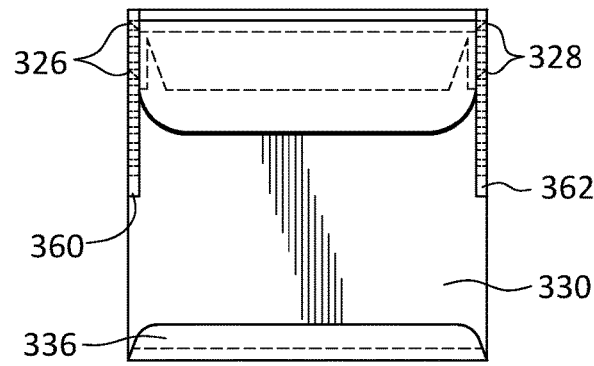
FIG. 10 is a front elevational view of the clip portion of FIG. 9.
Figure 11:
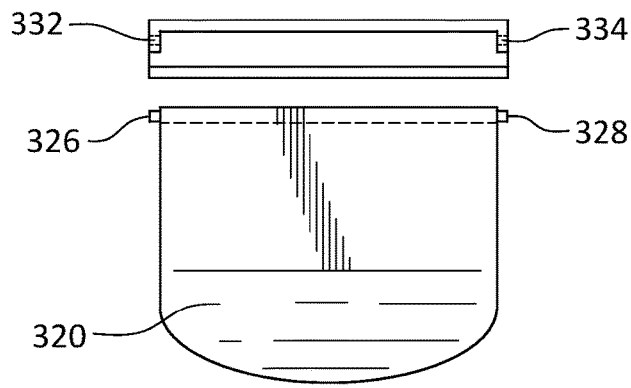
FIG. 11 is a top plan view of the clip portion of FIG. 9.

Another alternative mount clip 310 is shown in FIGS. 9-11. This alternative mount clip 310 has two pieces: a first arm 330 and a second arm 320. The second arm 320 has an arm extension 322 that depends downwardly from a center portion 316 of the mount clip 310. The first arm 330 defines upper channels 360, 362 with a series of holes 332, 334 through the side edges thereof. The arm extension 322 of the second arm 320 has prongs or ratchet teeth 326, 328 projecting therefrom. The arm extension 322 of the second arm 320 is slidably engaged within channels 360, 362 formed in a top portion of the first arm 330. Each channel 360, 362 defines a slot opening to receive a respective arm extension 322 of the second arm 320. The prongs or ratchet teeth 326, 328 may engage with the holes 332, 334 in the upper channels 360, 362 at the proximal end of the first arm 330. The first arm 330 terminates at its distal end with either a hook 336 comparable to the embodiment shown in FIGS. 3 and 4 or a bent edge 342 comparable to the embodiment shown in FIGS. 1 and 2. The relative positions of the arm extension 322 with the first arm 330 may be varied by sliding the arm extension 322 of the second arm 320 within the channels 360 to register the prongs 326, 328 within desired holes 332, 334 to thereby extend or shorten the length of the portion of the first arm 330 and arm extension 322 that is insertable into the slot 104 of the motor vehicle 100. In this manner, the mount clip 310 may be adapted for use with vehicle doors of different vehicle types. The first arm 330 with the arm extension 322 inside the respective channel 360, 362 together slidably engage into the window slot 104, and the hook 336 or bent edge 342 contacts the window gasket 110 to secure the mount clip 310 to the vehicle door 100.

The mount clips 10, 210, and 310 may be fabricated from thermosetting plastics, fiber reinforced polymers, fiberglass reinforced plastics, carbon fiber reinforced polymers, rubbers, and/or latex. Polypropylenes and polyvinyl chlorides are examples of suitable thermosetting plastics. It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

REFERENCE NUMBERS

- 10 mount clip
- 12 top surface
- 14 bottom surface
- 16 center portion
- 18 fastener
- second arm
- 22 front edge of second arm
- 24 left side edge of second arm
- 26 right side edge of second arm
- 28 ratchet teeth
- 30 first arm
- 32 straight portion
- 34 bottom edge of first arm
- 36 hook or curved tip
- 38 bottom edge
- 42 bent edge
- 46 arm extension
- 48 ratchet teeth
- 50 mount fixture
- 52 top surface
- 54 bottom surface
- 56 hook and loop fastener
- 60 foot of cellphone mount
- 62 bottom surface
- 66 goose neck of cellphone mount
- 70 rotatable fixture
- 80 cradle or tray to receive cellphone
- 82 size adjusting frame of cradle or tray
- 90 cellphone
- 100 vehicle door
- 102 windowpane
- 104 slot in door—glass guide channel
- 106 passenger compartment cabin door trim
- 108 door panel exterior
- 110 window gasket
- 112 metal door structure—inner door panel
- 210 clip mount
- 212 top surface
- 214 bottom surface
- 216 center portion
- 220 front arm
- 222 front end/edge
- 224 left side edge
- 226 right side edge
- 230 rear arm
- 232 straight region
- 238 bottom edge
- 240 face surface
- 242 bent portion
- 310 mount clip
- 316 center portion
- 320 second depending arm
- 322 arm extension
- 326 prong
- 328 prong
- 330 first depending arm
- 332 receiving channels
- 334 receiving channels
- 336 curved tip or hook
- 342 bent edge
- 360 channel
- 362 channel

The invention claimed is:

1. A holder for a handheld device for attachment to a door of a motor vehicle, comprising: a mount clip having a center portion, a first arm depending downwardly from the center portion that has a substantially straight length and terminates at its distal end with a bent edge with at least a first bend and a second bend, and a second arm depending downwardly from the center portion that either has a substantially curved length or, if straight, is disposed at an obtuse angle to the center portion; wherein said first arm is configured to insertedly fit into a window slot of a motor vehicle door between a windowpane and a door panel of the window, and wherein at least one bend of the first bend and second bend of the bent edge is configured to engage under at least a portion of a gasket associated with the window slot.

2. The holder of claim 1, further comprising:
a mount fixture extending either from a top surface of the center portion gr from a top surface of the second arm, and configured to engage with the handheld device.

3. The holder of claim 2, wherein the mount fixture further comprises a gooseneck and a cradle configured to receive the handheld device.

4. The holder of claim 1, wherein the mount clip is formed of a material selected from the group consisting of: thermosetting plastics, fiber reinforced polymers, fiberglass reinforced plastics, carbon fiber reinforced polymers, rubbers, and latex.

5. The holder of claim 1, wherein the handheld device comprises one of a cellular telephone, a pager, a navigation system unit, a hand sanitizer bottle or container, a trash receptacle or bag, or a tissue dispenser or box.

6. The holder of claim 1, wherein the mount clip is formed of a material selected from the group consisting of: thermosetting plastics, fiber reinforced polymers, fiberglass reinforced plastics, carbon fiber reinforced polymers, rubbers, and latex.

7. A holder for a handheld device for attachment to a door of a motor vehicle, comprising:
a mount clip that has a first arm and a second arm, wherein the first arm has a substantially straight length and terminates at its distal end with a bent edge with at least a first bend and a second bend, and wherein the second arm has a center portion, an arm portion depending downwardly from the center portion that has a substantially curved length or if straight is disposed at an obtuse angle to the center portion, and a second arm extension depending downwardly from the center portion, wherein the second arm extension is slidingly engageable with the first arm;

wherein said first arm and said arm extension when joined together are configured to insertedly fit into a window slot of a motor vehicle door between a windowpane and a door panel of the window, and wherein at least one bend of the first bend and second bend of the bent edge of the first arm is configured to engage with under a portion of a gasket associated with the window slot.

8. The holder of claim 7, further comprising:

a mount fixture extending either from a top surface of the center portion g from a too surface of the second arm, and configured to engage with the handheld device.

9. The holder of claim 8, wherein the mount fixture further comprises a gooseneck and a cradle configured to receive the handheld device.

10. The holder of claim 7, wherein the mount clip is formed of a material selected from the group consisting of: thermosetting plastics, fiber reinforced polymers, fiberglass reinforced plastics, carbon fiber reinforced polymers, rubbers, and latex.

11. The holder of claim 7, wherein the handheld device comprises one of a cellular telephone, a pager, a navigation system unit, a hand sanitizer bottle or container, a trash receptacle or bag, or a tissue dispenser or box.

12. The holder of claim 7, wherein the second arm extension has at least a first prong extending from a left side and at least a second prong extending from a right side, with said prongs configured to engage with respective receiving holes defined by the first arm.

13. A holder for a handheld device for attachment to a door of a motor vehicle, comprising:

a mount clip having a center portion, a first arm depending downwardly from the center portion that has a substantially straight length and terminates at its distal end with a hook with a radius of curvature, and a second arm depending downwardly from the center portion that either has a substantially curved length or, if straight, is disposed at an obtuse angle to the center portion;

wherein said first arm is configured to insertedly fit into a window slot of a motor vehicle door between a windowpane and a door panel of the window, and wherein the hook is configured to engage under at least a portion of a gasket associated with the window slot.

14. The holder of claim 13, further comprising:

a mount fixture extending either from a top surface of the center portion or from a top surface of the second arm, and configured to engage with the handheld device.

15. The holder of claim 14, wherein the mount fixture further comprises a gooseneck and a cradle configured to receive the handheld device.

16. The holder of claim 13, wherein the handheld device comprises one of a cellular telephone, a pager, a navigation system unit, a hand sanitizer bottle or container, a trash receptacle or bag, or a tissue dispenser or box.

17. A holder for a handheld device for attachment to a door of a motor vehicle, comprising:

a mount clip that has a first arm and a second arm, wherein the first arm has a substantially straight length and terminates at its distal end with a hook with a radius of curvature, and wherein the second arm has a center portion, an arm portion depending downwardly from the center portion that has a substantially curved length or if straight is disposed at an obtuse angle to the center portion, and a second arm extension depending downwardly from the center portion, wherein the second arm extension is slidingly engageable with the first arm;

wherein said first arm and said arm extension when joined together are configured to insertedly fit into a window slot of a motor vehicle door between a windowpane and a door panel of the window, and wherein the hook of the first arm is configured to engage under a portion of a gasket associated with the window slot.

18. The holder of claim 17, further comprising:

a mount fixture extending either from a top surface of the center portion or from a top surface of the second arm, and configured to engage with the handheld device.

19. The holder of claim 18, wherein the mount fixture further comprises a gooseneck and a cradle configured to receive the handheld device.

20. The holder of claim 17, wherein the second arm extension has at least a first prong extending from a left side and at least a second prong extending from a right side, with said prongs configured to engage with respective receiving holes defined by the first arm.

* * * * *